455-612 AU 233 EX

FIP8106 XR 3,384,837

[redacted]

g1-22-64

May 21, 1968 HANS-NORBERT TOUSSAINT ET AL 3,384,837

MODULATOR WITH EMISSIVE DIODE AND PHOTODIODE FOR THE MODULATION OF A CARRIER OSCILLATION WITH A SIGNAL OSCILLATION

Filed Jan. 21, 1965

INVENTORS
Hans-Norbert Toussaint
Reginhard Pospischil
BY Spies & Spies ATTYS.

United States Patent Office 3,384,837

Patented May 21, 1968

3,384,837
MODULATOR WITH EMISSIVE DIODE AND PHOTODIODE FOR THE MODULATION OF A CARRIER OSCILLATION WITH A SIGNAL OSCILLATION

Hans-Norbert Toussaint, Munich, and Reginhard Pospischil, Grafelfing, Germany, assignors to Siemens Aktiengesellschaft, Munich, Germany, a corporation of Germany Filed Jan. 21, 1965, Ser. No. 427,183
Claims priority, application Germany, Jan. 27, 1964, S 89,239
9 Claims. (Cl. 332—3)

ABSTRACT OF THE DISCLOSURE

An arrangement for the modulation of a carrier oscillation with a signal oscillation using an emissive diode optically coupled to a photodiode, in which the carrier oscillation and the signal oscillation can be fed as desired into the emissive diode circuit and/or the photodiode circuit, and in which the modulation product is removed from the photodiode circuit.

The invention relates to an apparatus for the modulation of a carrier oscillation with a signal oscillation, which is provided with means for the frequency-selective extraction of the required modulation product.

As modulators, in actual practice there are frequently utilized, besides electron tubes with several electrodes, circuits with diodes, such as the ring modulator or the well-known diode heterodyne stage, such as is used, for example, in microwave receivers. In modulators of this type it proves to be relatively difficult, from a practical standpoint, to completely uncouple individual connections with respect to other connections over a broad frequency range.

In an apparatus according to the invention for the modulation of a carrier oscillation with a signal oscillation, which is provided with means for the frequency-selective extraction of the required modulation product, a practically complete uncoupling at least of individual connections is achieved through the provision of at least one emission diode optically coupled with at least one photodiode in which the emission diode is also included in the current circuit of one of the two oscillations and into the circuit of the photodiode there is inserted the means for the frequency selective extraction of the required modulation product, while in the circuit of the other oscillation there is included one of the two diodes or an additional emission diode optically coupled with a photodiode.

It is advantageous if, instead of a single emission diode, several emission diodes are provided and connected in series, the radiation of which is fed to the photodiode or diodes. In this connection it is also recommended that, instead of a single photodiode, several photodiodes be provided and electrically connected in parallel.

A further advantageous development resides in the feature that the circuit is symmetrically designed at least at the side of the photodiodes.

In the drawings wherein like reference characters indicate like or corresponding parts:

Diode modulators normally employed have a great drawback in that they are not free of retroaction or feedback. Since the diode is a bi-pole, no uncoupling of the currents or voltages of the individual frequency is possible, and in order to obtain a solution therefor, transistor modulators have been proposed. In these, the modulation-effecting nonlinear emitter-base junction of the transistor is practically uncoupled from the load disposed in the collector circuit of the transistor by a nonreciprocal amplifier element (the transistor). An adequate uncoupling—that is, also an adequate freedom from a feedback in the transistor modulator—can be achieved, however, only at relatively low frequencies, since at higher frequency the collector circuit is coupled with the input circuit over the collector capacitance and the base resistance of the transistor. It is the aim of the invention to produce a modulator free of feedback, even at high modulation frequencies having an order of magnitude in the gigacycle range. This consists, in its simplest form, of an electro-optical energy transducer and an opto-electrical transducer optically coupled therewith, in which arrangement the load developing the modulation product is connected electrically in series with the opto-electrical transducer. The two signals to be modulated with one another are fed, either additively to the electro-optical transducer, or the one signal is fed to the electro-optical transducer and the other signal is fed to a series circuit comprising the opto-electrical transducer and the load. The modulator according to the invention is free of feedback, because a phototransmission is possible only in the single direction from the electro-optical transducer to the opto-electrical transducer.

Figure 1:
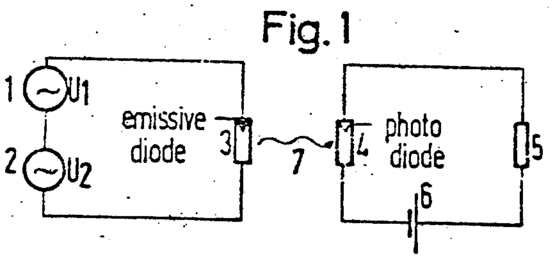
FIG. 1 illustrates the circuit of a simple embodiment of the invention serving for an explanation of the principles involved.

FIG. 1 illustrates a first example of a modulator according to the invention. The sources of the two voltages to be modulated with the frequencies $\omega_1$ and $\omega_2$ are designated as 1 and 2. The voltages of the sources mentioned are additively applied to the electro-optical transducer 3. The latter is an emission diode, for example a gallium-arsenide diode, a gallium-phosphide diode or the like, that is, a device which transforms the electric current flowing through it into electro-magnetic radiation and has nonlinear properties. For adjustment to a favorable working point it may, under some circumstances be expedient to insert, in series with the two voltage sources, a direct voltage source, not illustrated in the basic circuit diagram of FIG. 1. The opto-electrical transducer 4, for example, a photodiode, is connected in series with the load 5 and a direct voltage source 6. The term "photodiode" is intended to mean a device which converts the electromagnetic radiation into an electric current. The load 5 in FIG. 1 is, in actual practice, the generally complex input resistance of a filter, by means of which the desired modulation product is separated out. The photons emitted from the electro-optical transducer 3 (indicated in FIG. 1 by the wavy line 7) strike the opto-electrical transducer 4, in which they generate electrical charge carriers.

The operation of the system is explained in the following:

The power $P_s$ of the light radiated by the electro-optical transducer is given by the relation:

$$P_s = N \cdot E_{Ph} = N \cdot h \cdot f \qquad (1)$$

In which N signifies the number of photons emitted per time unit, $E_{Ph}$ the energy of the photon, $h$ the Planck action quantum and $f$ the frequency of the emitted light. According to hypothesis, let there [illegible] the voltage $U_s=U_1+U_2$ at the electro-optical transducer 3 and the power $P_s$ radiated therefrom, a nonlinear relationship, which may be described by an exponential series.

$$P_s=a_1U_s+a_2U_s^2+\ldots \quad (2)$$

Of special interest as electro-optical transducers are the electroluminescence plate and the Ga-As emission diode that has recently become known. In the emission diodes, a distinction is made between two types, the one type of which emits incoherent radiation while the other type emits coherent radiation. The systems according to the invention are capable of operating with both types.

From Equations 1 and 2 the number N of photons emitted per time unit can be determined as a function of the voltage $U_s$ as $$N=\frac{1}{hf}[a_1U_s+a_2U_s^2+\ldots] \quad (3a)$$

or with the summarization $1/hf\cdot a_n=b_n$ as $$N=b_1U_s+b_2U_s^2+\ldots \quad (3b)$$

The number N of the light quanta emitted per time unit, therefore, is likewise a nonlinear function of the voltage $U_s=U_1+U_2$.

The opto-electrical transducer 4, for example a photodiode, converts the incident light quanta with the quantum efficiency into electrical charge carriers available for the current transmission $$Q=\eta\cdot N \quad (4)$$

Here, Q designates the electric charge carriers generated per time unit with, in each case, the elementary charge $q$.

The electrical current $I_E$ flowing through the opto-electrical transducer is thus given by the relation $$I_E=q\cdot Q=q\cdot\eta\cdot N=q\cdot\eta b_1U_s+b_2U_s^2\ldots \quad (5)$$

The greater the current, the greater is the quantum efficiency $\eta$, and with the use of so-called photo-resistors of cadmium sulfide, the quantum efficiency can be considerably greater than one, as, for example, 200. The quantum efficiency $\eta$ is, however, dependent upon voltage, which voltage dependence may make itself troublesomely noticeable in the arrangement according to FIG. 1 if the resistance value of the load impedance 5 is selected so great that the alternating voltage occurring at it no longer is small as compared to the voltage of the direct current source 6, for example, a battery. However, since photoresistors allow operating voltages of several hundred volts, the voltage dependency of their quantum efficiently does not constitute any serious drawback.

The quantum efficiency for semiconductor photodiodes, for example of germanium, is approximately one, for example 0.9. The quantum efficiency, in the case of adequately high blocking voltages (greater than one volt) is practically independent of the magnitude of the voltage lying on the photodiode. That is, in photodiodes high operating resistances are permissible. A further advantage of the photodiodes is that they have a low inertia and, therefore, are usable for modulation frequencies in the gigacycle range.

It is assumed that the source 1 in the modulator according to FIG. 1 generates a voltage $U\cos\omega_1t$ and the source 2 generates the voltage $U_2\cos\omega_2t$. In Equation 5, then, the voltage $U_s$ is given by $$U_sU\cos\omega_1t+U_2\cos\omega_2t \quad (6)$$

Under the assumption of a voltage-dependent quantum efficiency $\eta$, which can be fulfilled at least approximately by suitable operating conditions, there is obtained with Equation 5 the current $I_E$ flowing in the circuit of the opto-electrical transducer as $$I_E=q\cdot\eta[b_1U_1\cos\omega_1t+b_1U_2\cos\omega_2t+\tfrac{1}{2}b_2(U_1^2+U_2^2)+\tfrac{1}{2}b_2U_1^2\cos 2\omega_1t+\tfrac{1}{2}b_2U_2^2\cos 2\omega_2t+b_2U_1U_2\cos(\omega_1+\omega_2)t+b_2U_1U_2\cos(\omega_1-\omega_2)t+\ldots] \quad (7)$$

Besides the two current components with the desired frequencies $(\omega_1+\omega_2)$ and/or $(\omega_1-\omega_2)$ there arise also other current components with undesired frequencies.

In the above equations the development was carried out in each case explicitly only up to the quadratic term. In practice, under some circumstances, terms of higher order must also be taken into consideration. This especially applies in the use of coherently radiating emission diodes as electro-optical transducers. From the characteristic curve equations it is possible in a manner well known for diode mixing stages, also to derive the conditions for the operating points and the amplitude relations of the individual signals, which matters, for reasons of brevity, will not be discussed.

Figure 2:
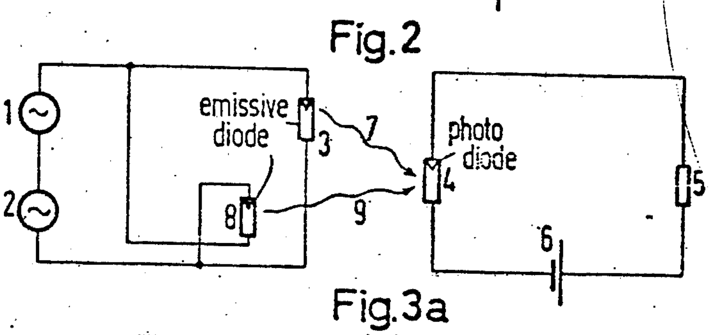
FIG. 2 illustrates an embodiment of the invention utilizing two oppositely phased electro-optical transducers.

The components with undesired frequencies can be suppressed in a manner known, per se, by suitable formation of the circuit. As an example of this, FIG. 2 illustrates a modulator which uses a second electro-optical transducer 8 fed in counterphase, which is likewise optically (photon current 9) coupled with the opto-electrical transducer.

It can be shown that with this circuit arrangement and like working conditions for the two electro-optical transducers 3, 8, with reference to the optical-electro transducer 4, currents with the frequencies $\omega_1$ and $\omega_2$ do not appear in the output circuit.

Figure 3A:
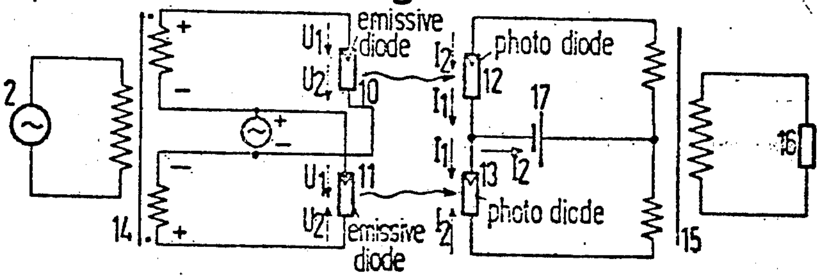
FIG. 3a illustrates an embodiment of the invention utilizing two electro-optical transducers and two opto-electrical transducers.
Figure 3B:
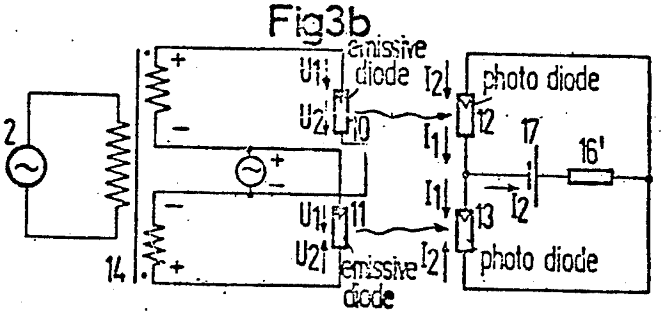
FIG. 3b illustrates a modification of the invention.

As a further example of the invention, FIG. 3a illustrates a modulator with two electro-optical transducers 10, 11, which are optically coupled with the respective opto-electrical transducers 12, 13. The two sources 1, 2 are so connected over a transformer 14 that on the transducer 10 there occurs the sum of the two voltages of the sources 1 and 2, but at the transducer 11, on the other hand, there occurs the difference of the two voltages of the sources 1 and 2, with the opto-electrical transducers being connected in a bridge arrangement. It can be shown that through the load 16, situated in the output circuit of the transformer 15 there flows currents having the frequencies $\omega_2$, $\omega_1+\omega_2$, $\omega_1-\omega_2$. The battery 17 forms the current supply for the opto-electrical transducers. The transformer 15 can be omitted if the load 16 is inserted in the common current path of the two opto-electrical transducers, as indicated, for example, in FIG. 3b.

Figure 4:
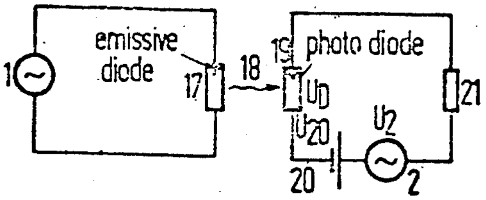
FIG. 4 illustrates a further development of the circuit illustrated in FIG. 1.

FIG. 4 illustrates a further development of the modulator arrangement according to FIG. 1, in which use is made of the "voltage dependence of the quantum efficiency" of the opto-electrical transducer 19. "Voltage dependence of the quantum efficiency" is here, purely formally, to be understood as cause for the voltage dependence of the current flowing through the opto-electrical transducer. The physical causes may be of another nature. For example, the drift velocity of the charge carriers is a function of the electric field strength and thereby of the voltage being applied.

The source 1 feeds the electro-optical transducer 17, possibly with inclusion of a direct current source (not represented) serving for biasing the transducer to the desired operating point. The photons 18 emitted thereby are supplied to the opto-electrical transducer 19 which is connected in series with a direct voltage source 20, the alternating voltage source 2 and the load 21. If the (apparent) voltage dependence of the quantum efficiency is expressed in the form $$\eta=\eta_0+\eta_1U_2\cos\omega_2t \quad (8a)$$

and there is assumed $$U_s=U_1\cos\omega_1t \quad (8b)$$

then there is obtained the current $I_E$ flowing through the opto-electrical transducer, wherein $$I_E=q(\eta_0+\eta_1U_2\cos\omega_2t)(b_1U_1\cos\omega_1t+b_2U_1^2\cos^2\omega_1t+\ldots) \quad (9)$$

From Equation 9 it is apparent that a modulation occurs even when a linear relation exists between the voltage at the electro-optical transducer 19 and the power emitted from the transducer 17.

With use of photodiodes as opto-electrical transducers in the arrangement of FIG. 4, the selected voltage of the source 2 must be of such a magnitude that the effective voltage at the photodiode $U_D = U_2 + U_{20}$ is approximately equal to zero once per cycle of the voltage of source 2 or even poles the diode weakly in conducting direction.

The principle explained with the aid of FIG. 4 is also usable in other modulator circuits, for example in push-pull or bridge circuits.

Figure 5:
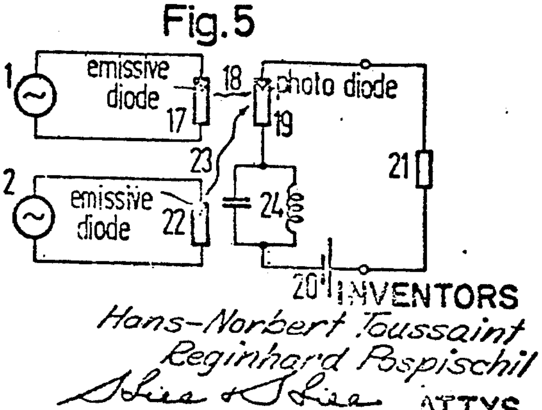
FIG. 5 illustrates a further embodiment which proceeds from the circuit arrangement of FIG. 4.

Another example of the invention is illustrated in FIG. 5, which proceeds from the circuit principle of FIG. 4. The signal source 2 is here coupled in the above-described manner, but with a separate electro-optical transducer 22. The electromagnetic or optical radiation of the transducer 22 is supplied to the opto-electrical transducer 19. So that the required voltage control will be achieved with the signal of 2 in the current circuit of the opto-electrical transducer 19, a parallel resonance circuit 24, tuned to the frequency of 2, is inserted in the transducer circuit.

In closing, consideration should be given to the realization of the optical coupling between the electro-optical and the opto-electrical transducer. In the simplest case, the radiation from the output aperture of electro-optical transducers will be allowed to strike the radiation input aperture of the opto-electrical transducer. For the improvement of the optical adaptation it is, however, expedient to provide special optical coupling elements. For this there come into consideration:

(a) A collecting lens which is disposed in the beam path between the electro-optical transducer and the opto-electrical transducer and directs the light, in bundled form, onto the photosensitive layer of the opto-electrical transducer.

(b) A mirror which reflects the light emerging from the electro-optical transducer, in bundled form, to the opto-electrical transducer.

(c) A fiber optic, such as a so-called optical waveguide, for example of glass fiber.

In the event the two optically coupled transducers are spatially arranged too closely, otherwise conditioned by capacitive or inductive coupling of the two transducers, there may also occur, under some circumstances, an undesired feedback. This feedback can be avoided, as a practical matter, by greater separation from one another of the two transducers.

Finally, the possibility also exists of carrying out a further modulation in the optical transmission. For this there are suitable, preferably modulators, which utilize the Kerr effect or Pockel's effect.

The electrical series connection of several emission diodes and/or the electrical parallel connection of several photodiodes has, in detail, the following advantages: In the series electrical connection of several emission diodes, the movement of a certain number of charge carriers in a differential line section has as a consequence a corresponding charge carrier movement in each of the emission diodes. In each of the emission diodes, therefore, through the corresponding simultaneous charge carrier movement there is released from or delivered a proportion of photons corresponding to the particular quantum efficiency of such emission diode. Therefore, even if the quantum efficiency in the individual emission diode lies considerably under 100%, through a corresponding number of emission diodes, connected in series, there can be achieved a quantum number which lies correspondingly higher, as compared to an individual emission diode of the total number. It is then possible to arrive at a quantum efficiency greater than 100%, or greater than 1.

The photons delivered by the individual emission diodes can be directly supplied to a common photodiode. It is then only necessary to correspondingly align the individual emission diodes relative to the common photodiode. In a further development of the invention, several photodiodes, in electrical parallel circuit can be provided for the signal flow. There, for example, a photodiode can be allocated to each emission diode. There may, however, also be provided more or less photodiodes. In this case it is then only necessary to divide the photon current of the emission diodes correspondingly over the individual photodiodes, electrically connected in parallel for the reception of the signal currents. The use of several photodiodes with an emission diode is recommended, especially if the emission diode does not bundle its photon radiation into a narrow space sector, but delivers it distributed over a larger range. It is then possible to appreciably reduce the loss in photons, which otherwise would not reach a photodiode.

Changes may be made within the scope and spirit of the appended claims which define what is believed to be new and desired to have protected by Letters Patent.

We claim:

1. Apparatus for modulating a first signal with a second signal comprising,
first and second signal sources,
first emissive diode means connected in circuit with the first and second signal sources,
a photodiode optically coupled to the first emissive diode means, and
filtering means connected to the photodiode to select the desired modulation products.

2. Apparatus according to claim 1 wherein the first and second signal sources and the diode means are connected in series.

3. Apparatus according to claim 2, a second emissive diode means connected in parallel with the first emissive diode means and optically coupled to the photodiode.

4. Apparatus according to claim 3 wherein the first and second emissive diodes are poled and are connected in parallel with opposite polarity.

5. Modulating apparatus for modulating a first signal with a second signal and removing undesired intermodulation products comprising,
first and second signal sources,
a pair of emissive diodes,
the first signal source having one of its output terminals connected to the anode of one of the emissive diodes and its other output terminal connected to the cathode of the other emissive diode,
a transformer with a primary and two secondaries with its primary connected in circuit with the second signal source and with its first secondary having its opposite ends connected to the anodes of the first and second emissive diodes and the second secondary having its opposite ends connected to the cathodes of the first and second emissive diodes,
first and second photodiodes with the first diode optically coupled to the first emissive diode and the second diode optically coupled to the second emissive diode,
the cathode of the first photodiode connected to the anode of the second photodiode,
the anode of the first photodiode connected in circuit with the cathode of the second photodiode,
and an output filtering means connected in circuit with the first and second photodiodes.

6. Apparatus according to claim 5 wherein a second transformer with a pair of primaries and a secondary has its secondary connected across the output filtering means and has its first primary connected across the first photodiode and its second primary connected across the second photodiode.

7. Apparatus for modulating a first signal with a second signal and removing undesired intermodulation products comprising,
first and second signal sources,
an emissive diode means connected across the first signal source,
a photodiode optically coupled to the emissive diode means and connected in circuit with the second signal source, and an output filtering means connected in circuit with the emissive diode means and the second signal source to remove undesired intermodulation products.

8. Apparatus for modulating a first signal with a second signal and removing undesired intermodulation products comprising, first and second signal sources, a pair of emissive diodes with one connected in circuit with the first signal source and the other connected in circuit with the second signal source, a photodiode optically coupled to the first and second emissive diodes, and an output filtering means connected in circuit with the photodiode.

9. Apparatus according to claim 8 having second filtering means parallel resonant at the output frequency of the first signal source connected in circuit with the photodiode and the output filtering means.

References Cited

UNITED STATES PATENTS

| | | | |
|---|---|---|---|
| 2,648,823 | 8/1953 | Kock et al. | 331—66 X |
| 2,776,367 | 1/1957 | Lehovec | 250—199 X |
| 3,040,178 | 6/1962 | Lyman et al. | 307—88.5 |
| 3,183,452 | 5/1965 | Sack | 307—88.5 |
| 3,268,733 | 8/1966 | Deelman et al. | 332—3 X |
| 3,304,430 | 2/1967 | Biard et al. | 307—88.5 |

ALFRED L. BRODY, *Primary Examiner.*